(12) United States Patent
Frick et al.

(10) Patent No.: US 7,003,187 B2
(45) Date of Patent: Feb. 21, 2006

(54) OPTICAL SWITCH WITH MOVEABLE HOLOGRAPHIC OPTICAL ELEMENT

(75) Inventors: Roger L. Frick, Hackensack, MN (US); Charles R. Willcox, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 67 days.

(21) Appl. No.: 09/905,736

(22) Filed: Jul. 13, 2001

(65) Prior Publication Data

US 2002/0048423 A1   Apr. 25, 2002

Related U.S. Application Data

(60) Provisional application No. 60/271,103, filed on Feb. 23, 2001, provisional application No. 60/223,503, filed on Aug. 7, 2000, provisional application No. 60/223,508, filed on Aug. 7, 2000.

(51) Int. Cl.
    G02B 6/26    (2006.01)
    G02B 6/42    (2006.01)
    G02B 6/34    (2006.01)

(52) U.S. Cl. .......................... 385/16; 385/17; 385/18; 385/30; 385/37

(58) Field of Classification Search ............ 385/14–18, 385/37, 129–131, 30; 359/13, 290, 291, 359/295, 222, 566–572
    See application file for complete search history.

(56) References Cited

U.S. PATENT DOCUMENTS

| 3,514,183 A | 5/1970 | Rabedeau |
| 3,947,630 A | 3/1976 | Javan |
| 4,013,000 A | 3/1977 | Kogelnik |
| 4,111,524 A | 9/1978 | Tomlinson, III |
| 4,115,747 A | 9/1978 | Sato et al. |
| 4,165,155 A | 8/1979 | Gordon, II et al. |
| 4,257,016 A | 3/1981 | Kramer, Jr. et al. |
| 4,303,302 A | 12/1981 | Ramsey et al. |
| 4,356,730 A | 11/1982 | Cade |
| 4,387,955 A | 6/1983 | Ludman et al. |

(Continued)

FOREIGN PATENT DOCUMENTS

DE      36 02 653 A1      7/1987

(Continued)

OTHER PUBLICATIONS

Chan, "Compact Disc Pickup Designs" Jul. 18, 2000.

(Continued)

*Primary Examiner*—Georgia Epps
*Assistant Examiner*—Jack Dinh
(74) *Attorney, Agent, or Firm*—Marshall, Gerstein & Borun LLP

(57) ABSTRACT

An optical switch formed of a holographic optical element (HOE) disposed above a top surface of a substrate and moveable relative thereto is shown. Light is traveling through the substrate under total internal reflection, which creates an evanescent field extending beyond the reflecting surfaces of the substrate. The HOE is characterized, in one embodiment, by being formed from a plurality of strips that are moveable between a first position in which the strips are above the evanescent field and a second position in which the strips are inside the evanescent field. In the first position, the light in the substrate propagates unaffected by the HOE in a primary direction of propagation. In the second position, the light in the substrate is altered by the HOE and made to propagate in a reflected direction oblique to that of the primary direction of propagation.

48 Claims, 13 Drawing Sheets

U.S. PATENT DOCUMENTS

| | | | |
|---|---|---|---|
| 4,498,730 A | 2/1985 | Tanaka et al. | |
| 4,571,024 A | 2/1986 | Husbands | |
| 4,626,066 A | 12/1986 | Levinson | |
| 4,657,339 A | 4/1987 | Fick | |
| 4,662,746 A | 5/1987 | Hornbeck | |
| 4,674,828 A | 6/1987 | Takahashi et al. | |
| 4,693,544 A | 9/1987 | Yamasaki et al. | |
| 4,705,349 A | 11/1987 | Reedy | |
| 4,710,732 A | 12/1987 | Hornbeck | |
| 4,715,680 A | 12/1987 | Kawaguchi et al. | |
| 4,718,056 A | 1/1988 | Schultheiss | |
| 4,755,415 A | 7/1988 | Iijima et al. | |
| 4,764,889 A | 8/1988 | Hinton et al. | |
| 4,815,827 A | 3/1989 | Lane | |
| 4,867,532 A | 9/1989 | Stanley | |
| 4,904,039 A | 2/1990 | Soref | |
| 5,024,500 A | 6/1991 | Stanley et al. | |
| 5,029,981 A | 7/1991 | Thompson | |
| 5,036,042 A | 7/1991 | Hed | |
| 5,040,864 A | 8/1991 | Hong | |
| 5,063,418 A | 11/1991 | Shurtz, II et al. | |
| 5,083,857 A | 1/1992 | Hornbeck | |
| 5,107,359 A | 4/1992 | Ohuchida | |
| 5,133,027 A | 7/1992 | Funazaki et al. | |
| 5,153,770 A | 10/1992 | Harris | |
| 5,155,617 A | 10/1992 | Solgaard et al. | |
| 5,155,778 A | 10/1992 | Magel et al. | |
| 5,157,756 A | 10/1992 | Nishimoto | |
| 5,221,987 A | 6/1993 | Laughlin | |
| 5,231,304 A | 7/1993 | Solomon | |
| 5,255,332 A | 10/1993 | Welch et al. | |
| 5,262,000 A | 11/1993 | Welbourn et al. | |
| 5,278,925 A | 1/1994 | Boysel et al. | |
| 5,291,566 A | 3/1994 | Harris | |
| 5,311,360 A * | 5/1994 | Bloom et al. | 359/572 |
| 5,315,676 A | 5/1994 | Sunagawa | 385/37 |
| 5,331,658 A | 7/1994 | Shieh et al. | |
| 5,377,288 A | 12/1994 | Kashyap et al. | |
| 5,455,709 A | 10/1995 | Dula, III et al. | |
| 5,491,762 A | 2/1996 | Deacon et al. | |
| 5,500,910 A | 3/1996 | Boudreau et al. | |
| 5,532,855 A | 7/1996 | Kato et al. | |
| 5,537,617 A | 7/1996 | Zavislan et al. | |
| 5,661,592 A | 8/1997 | Bornstein et al. | |
| 5,661,593 A | 8/1997 | Engle | |
| 5,682,255 A | 10/1997 | Friesem et al. | |
| 5,748,811 A | 5/1998 | Amersfoort et al. | |
| 5,770,855 A | 6/1998 | Fischer | |
| 5,771,320 A | 6/1998 | Stone | |
| 5,771,321 A | 6/1998 | Stern | |
| 5,786,925 A | 7/1998 | Goossen et al. | |
| 5,875,271 A | 2/1999 | Laughlin | |
| 5,892,598 A * | 4/1999 | Asakawa et al. | 359/13 |
| 5,960,133 A | 9/1999 | Tomlinson | |
| 5,966,223 A | 10/1999 | Friesem et al. | |
| 6,072,923 A | 6/2000 | Stone | |
| 6,072,925 A | 6/2000 | Sakata | |
| 6,093,941 A | 7/2000 | Russell et al. | |
| 6,169,613 B1 | 1/2001 | Amitai et al. | |
| 6,195,478 B1 | 2/2001 | Fouquet | |
| 6,212,314 B1 | 4/2001 | Ford | 385/30 |
| 6,288,829 B1 * | 9/2001 | Kimura | 359/291 |
| 6,389,189 B1 | 5/2002 | Edwards et al. | |
| 6,501,869 B1 | 12/2002 | Athale | |
| 6,631,222 B1 | 10/2003 | Wagener et al. | |
| 6,810,176 B1 | 10/2004 | Frick et al. | |
| 2001/0048265 A1 | 12/2001 | Miller et al. | |
| 2002/0159683 A1 | 10/2002 | Helln et al. | |
| 2003/0012483 A1 | 1/2003 | Rabedeau | |

FOREIGN PATENT DOCUMENTS

| | | |
|---|---|---|
| EP | 0137851 | 4/1985 |
| EP | 0277779 | 8/1988 |
| EP | 0 322 218 | 6/1989 |
| EP | 0 467 303 | 1/1992 |
| EP | 0279679 | 11/1992 |
| EP | 0 609 812 | 8/1994 |
| EP | 0 609 812 A1 | 8/1994 |
| EP | 0 969 306 | 1/2000 |
| GB | 2189038 A * | 10/1987 |
| JP | 57-35828 | 2/1982 |
| JP | 57-173814 | 10/1982 |
| JP | 57-173819 | 10/1982 |
| JP | 57-173820 | 10/1982 |
| JP | 59-147322 | 8/1984 |
| JP | 59-176731 | 10/1984 |
| JP | 59-185311 | 10/1984 |
| JP | 59-214020 | 12/1984 |
| JP | 60-22120 | 2/1985 |
| JP | 60-97319 | 5/1985 |
| JP | 60-134219 | 7/1985 |
| JP | 60-190038 | 9/1985 |
| JP | 61-121042 | 6/1986 |
| JP | 61-231522 | 10/1986 |
| JP | 62-49336 | 3/1987 |
| JP | 62-69247 | 3/1987 |
| JP | 62146443 | 6/1987 |
| JP | 4-30130 | 2/1992 |
| JP | 4-287028 | 10/1992 |
| JP | 5-93924 | 4/1993 |
| JP | 5-142587 | 6/1993 |
| JP | 6-95173 | 4/1994 |
| JP | 8-234246 | 9/1996 |
| JP | 10-206910 | 8/1998 |
| JP | 2000-105321 | 4/2000 |
| JP | 2000-221553 | 8/2000 |
| WO | WO 95/13638 | 5/1995 |
| WO | WO 00/02098 | 1/2000 |
| WO | WO 00/79311 | 12/2000 |
| WO | WO 01/42825 | 6/2001 |

OTHER PUBLICATIONS

Jahns, et al. "Planar Integration of Free-Space Optical Components," *Applied Optics* 28(9):1602-1605 (1989).

Krygowski et al. "Development of a Co mpact Optical-MEMS Scanner with Integrated VCSEL Light Source and Diffractive Optics," *SPIE* 3878:20-28 (1999).

Krygowski et al. "Integrated Microsystems" *Proc. Of SPIE* 3878:20-28 (1999).

Wendt, et al. "Fabricati on of diffractive optical elements for an integrated compact optical microelectromechanical system laser scanner," *J. Vac. Sci. Technol.* 18(6):3608-3611 (2000).

International Search Report from PCT/US02/13309, dated Apr. 25, 2002.

International Search Report from PCT/US02/13343.

Völkel, et al. "Optical backplane for a broadband switching system," *Electronics Letters* 31(3):234-235 (1995).

Tabib-Azar, et al. "Fiber-optics MEMS pressure sensors based on evanescent field interaction," *SPIE* 3276:135-146.

Xing, et al., "Contra-directional coupling between stacked waveguides using grating couplers," *Optics Communications*, 144:180-182 (1997).

Tabib-Azar, et al. "MOEM Pressure and Other Physical Sensors Using Photon Tunneling and Optical Evanescent Fields with Exponential Sensitivities and Excellent Stabilities," *Conf. on Microelectronic Structures and MEMS for Optical Processing* 3513:210-222 (1998).

* cited by examiner

OPTICAL SWITCH WITH MOVEABLE HOLOGRAPHIC OPTICAL ELEMENT

CROSS-REFERENCE TO RELATED APPLICATIONS

This application claims the benefit of U.S. Provisional Application No. 60/223,503, filed Aug. 7, 2000, U.S. Provisional Application No. 60/223,508 filed Aug. 7, 2000, and U.S. Provisional Application No. 60/271,103 filed Feb. 23, 2001.

FIELD OF THE INVENTION

The present invention relates generally to optical elements and more specifically to optical gratings and holographic optical elements used to perform optical switching functions.

BACKGROUND OF THE PRIOR ART

Diffractive optics using optical elements that affect propagating wavefronts by means of diffraction are known. Exemplary diffractive optical element (DOE) structures are diffraction gratings, zone plate lens and holographic mirrors. DOEs in which the diffracting element sizes are approaching or approximately equal to the wavelength of light are generally known as holographic optical elements (HOEs). One advantage to diffractive optics is that a structure, such as a DOE lens, may be constructed on a flat surface and can thus be smaller, cheaper and more easily aligned than a refractive optics counterpart. One disadvantage is that because diffractive optics structures are formed of patterns of diffracting elements they are sensitive to the wavelength of the light used.

HOEs can be recorded on optical media, such as photographic films, to create optical devices like lenses and prisms. The hologram patterns are diffraction patterns established by recording the interference pattern of two laser beams. The resulting diffraction pattern has constituent elements with dimensions on the order of a wavelength. HOEs can also be produced by mechanical means such as engraving with a diamond tool, photolithography or embossing with a hard metal master.

HOEs are advantageous, in certain applications, for a number of reasons. HOEs may be quite thin in profile, thereby allowing the fabrication of numerous optical elements of smaller size than traditional optical counterparts. Further, as HOEs are planar devices, complex optical systems may be assembled in a simplified manner using less space than typical multi-element optical systems. In fact, HOEs may be self-positioning, thereby greatly reducing the alignment problems associated with optical systems, especially complex optical systems.

In general, the diffraction pattern of HOEs are designed to transmit incident light into modes, or directions. Modes are conventionally labelled m=0+1, −1, +2, −2, etc. . . . according to their location with respect to the incident light. If the HOE is to be used as a lens or mirror two primary modes are typically involved, the m=0 mode and the m=−1 mode. In the m=0 mode, incident light appears unaffected by the HOE, i.e., if the HOE is a reflective element, light will be reflected into the zero order mode as though the light had been reflected by a flat mirror surface, and if the HOE is a transmissive element, light will exit the element as if it had been transmitted through a transparent optical media. The m=−1 mode is a direct result of the designed optical function of the HOE. This mode will be generally offset from the m=0 mode. In typical devices, the HOE is chosen so that the amplitude of light in the m=0 mode is minimized through destructive interference, and the amplitude of the desired m=−1 mode is maximized through constructive interference. The angle of incident light and size of the diffractive elements is generally chosen so that other modes that could interfere with the desired optical performance do not exist.

With their ability to reflect light from a normal path (i.e., coinciding with a m=0 mode) into a reflected mode (m=−1), there is a desire to employ HOEs in switching devices. Current designs of HOEs limit the use of HOEs as optical switches. HOEs are generally formed either within the bulk of a material or on the surface of a material. Holograms recorded in the volume of a holographic material have low losses, but are very difficult to mass-produce. Examples are three-dimensional structures formed in volume using electro-holographic materials switchable by application of an electric field. On the other hand, surface relief holograms may be mass-produced, but suffer from low optical efficiency. An added problem with these surface-relief holograms is that they are not switchable.

Despite the above shortcomings of existing HOEs and DOEs, it is nonetheless desirable to use HOEs and DOEs as switches with optical media.

SUMMARY OF THE INVENTION

In one embodiment, an optical switch has a substrate for transmitting an optical signal within the substrate, where the optical signal propagates in the substrate in a first direction under total internal reflection and has a diffractive optical element disposed above a top surface of the substrate and moveable relative thereto between a first position substantially out of evanescent field coupling with the optical signal, such that the optical signal continues to travel in the first direction, and a second position in evanescent field coupling with the optical signal to alter the propagation of the optical signal into a second direction. In some of these embodiments, the diffractive optical element is formed of a plurality of strips forming a diffraction grating, where each strip has a substantially equal width and where each of the strips are spaced apart a substantially equal spacing.

In another embodiment, a holographic optical element for use with an optical substrate has an incident light signal propagating within the substrate in a primary direction of propagation under total internal reflection. The holographic optical element has a plurality of spaced-apart strips formed of an optically transparent material and disposed above the top surface of the substrate. Furthermore, the holographic optical element has a suspension member adjacent to the strips and disposed for allowing movement of the strips from a first position in which the incident light signal is altered by the holographic optical element and a second position in which the incident light signal is unaltered by the holographic optical element. In some of these embodiments, the suspension member comprises a plurality of flexible arms mounted to the top surface of the substrate by a plurality of mounting members and coupled to the strips.

In another embodiment, a 1×N optical switch has a substrate for transmitting an optical signal within the substrate, where said optical signal propagates in the substrate in a first direction under total internal reflection. The 1×N optical switch also has N diffractive optical elements disposed above a top surface of the substrate and each individually moveable relative thereto between a first position substantially out of evanescent field coupling with the optical signal, such that the optical signal continues to travel in the first direction, and a second position in evanescent field coupling with the optical signal to alter the propagation of the optical signal into a second direction.

In yet another embodiment, an optical switch is provided for use with a substrate, the optical switch having a plurality of strips disposed above a top surface of the substrate for movement relative thereto, each strip being spaced apart a spacing distance and having a strip width. The sum, 'a', of the spacing distance and the strip width is chosen such that a light signal traveling within the substrate under total internal reflection and incident upon an area of the top surface below strips is reflected into a first diffracted order propagating within the substrate in a reflected direction of propagation defining an angle, $\alpha$, with respect to the incident direction of propagation and propagating within the substrate under total internal reflection.

DESCRIPTION OF THE PREFERRED EMBODIMENT

The present disclosure solves the above-described problems by providing a HOE that is easily fabricated and usable with an optical substrate to form an optical switch. Preferably, the HOEs described hereinbelow are grating structures that are moveable relative to an optical substrate within which a light signal travels. The movement of the HOE functions to couple and decouple the HOE with the substrate, so that if a light signal is traveling in the substrate the HOE may selectively interact with the light signal. For maximum efficiency, light is made to travel in the optical substrate under total internal reflection (TIR), which as will be understood includes a range of propagation paths of the light traveling in the substrate. Total internal reflection is a well known phenomena that allows light to be reflected from the interface between two optical materials without losses. This occurs if light is propagating in a material with a higher refractive index than a surrounding optical media and the light strikes the interface at an angle that is greater than a critical angle, measured from the normal to the interface.

TIR also makes coupling the HOE into and out of position easier, due to the evanescent field created at a reflection boundary under TIR conditions. A HOE may be coupled to and decoupled from the substrate by moving the HOE in and out of evanescent field coupling, and the amount of coupling between the HOE and the substrate can be controlled by how far into the evanescent field the HOE is moved.

Figure 1:
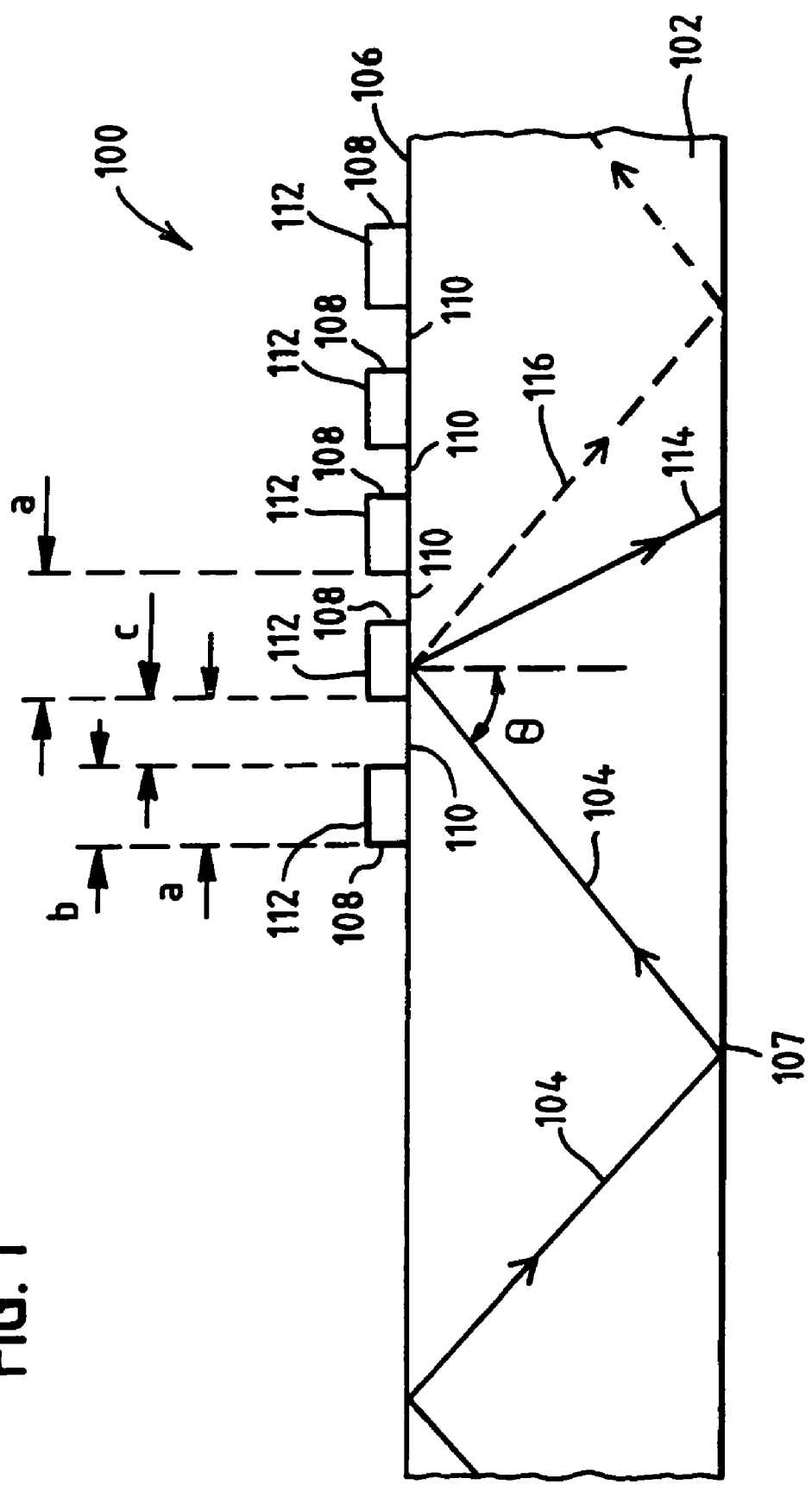
FIG. 1 is a cross-sectional view of a HOE having strips in physical contact with a top surface of an optical substrate.

By way of background and to explain the general operation of HOEs used with optical substrates, FIG. 1 shows a cross-sectional view of an HOE 100. The HOE 100 is described in detail in co-pending application entitled "Integrated Transparent Substrate and Diffractive Optical Element", Ser. No. 09/905,769, filed on Jul. 13, 2001, assigned the same inventors, which is incorporated herein by reference. The HOE 100 is disposed on an optical substrate 102, which in the preferred embodiment is optically transparent in the infrared region at least around 1550 nm or 1310 nm (vacuum wavelength), transmission wavelengths desirable for optical communications. The substrate 102 could be optically transparent at any desired wavelength, however. The substrate 102 may be made of a quartz material or another substrate material suitable for propagating a signal under TIR and for serving as an etch-stop surface for a photolithography process. In the preferred embodiment, the substrate 102 is made of sapphire.

An incident light beam 104 is traveling within the substrate 102, under total internal reflection, which as would be known occurs above a critical angle of incidence at the outer surface boundary of the substrate 102. An angle of incidence, $\theta$, is shown in FIG. 1 measured from a normal to a top surface 106 and extending into the substrate 102. For a sapphire substrate 102 surrounded by an air boundary in contact with the top surface 106, the critical angle is approximately 35° and so $\theta$ is to be at or above this value. The light beam 104 can be made incident upon the top surface 106 from angles above the critical angle and still facilitate HOE 100 operation. While in the preferred embodiment, air is disposed above the top surface 106, other materials may be disposed above the substrate 102 so long as these materials have an index of refraction less than that of the substrate 102 to establish the TIR conditions. Further, while TIR off of the top surface 106 and a bottom surface 107 of the substrate 102 offers the most efficient design with the least cost, one could alternatively have TIR on the top surface 106 and use mirrors or a reflective coating on the bottom surface 107 to reflect the light beam 104. Similarly, a cladding layer could be used below the bottom surface 107.

The HOE 100 comprises strips 108 disposed directly on a top surface 106 of the substrate 102. The strips 108 are formed of an optically transparent material and, as will be known, the geometry of the strips 108 will affect the properties and operation of the HOE 100. The embodiment of FIG. 1 shows the strips 108 formed in direct physical contact with the top surface 106. The strips 108 may be formed of a single crystal silicon, poly-silicon, or other optically transparent material. Only a few strips 108 are exemplarily shown, but in operation there would typically be a large number of such strips 108 to ensure that the light beam 104 is incident upon some part of the HOE 100. Further, the strips 108 are shown in cross-section and actually would extend into and out of the illustration.

The strips 108 have a width 'b' and are spaced apart a width 'c'. Grating period 'a' is equal to the sum of these two values. The HOE 100 reflects incident light beam 104 into light beam 114. The width 'a' affects the wavelength of light the HOE 100 is optimized to reflect and the angle of exit of the reflected light. In the preferred embodiment width 'b' is equal to width 'c', yet these widths may be non-equal, if so desired. Strip thickness and width can be adjusted to maximize the intensity of the reflected light. Additionally, there could be intra-width variation, wherein the width 'b' could vary (e.g., b1, b2, b3, etc.) and the width 'c' could vary (e.g., c1, c2, c3, etc.). For example, a HOE could be formed with different 'a' values (a1, a2, a3, etc.) where 'a' varies continuously, such that a1>a2>a3>etc. An exemplary apparatus could be used to reduce dispersion in the reflected signal or to increase the amount of dispersion therein, as might be useful in demultiplexing applications. As the strips 108 form a grating pattern of the HOE 100, exact dimensional precision is not necessary to produce a functioning device. The aggregate affect of the strips 108 is to minimize inexactness in the sizing of any particular strip 108. It is preferred, nonetheless, that the HOE 100 have 'a' periodicity, i.e., that 'a' is substantially the same throughout the HOE 100. In this way, 'a' is more influential on HOE 100 operation than 'b' or 'c'. In an exemplary structure, width 'a' would be on the order of 1.5 $\mu$m, i.e., about twice the wavelength of incident light in the media.

Figure 4A:
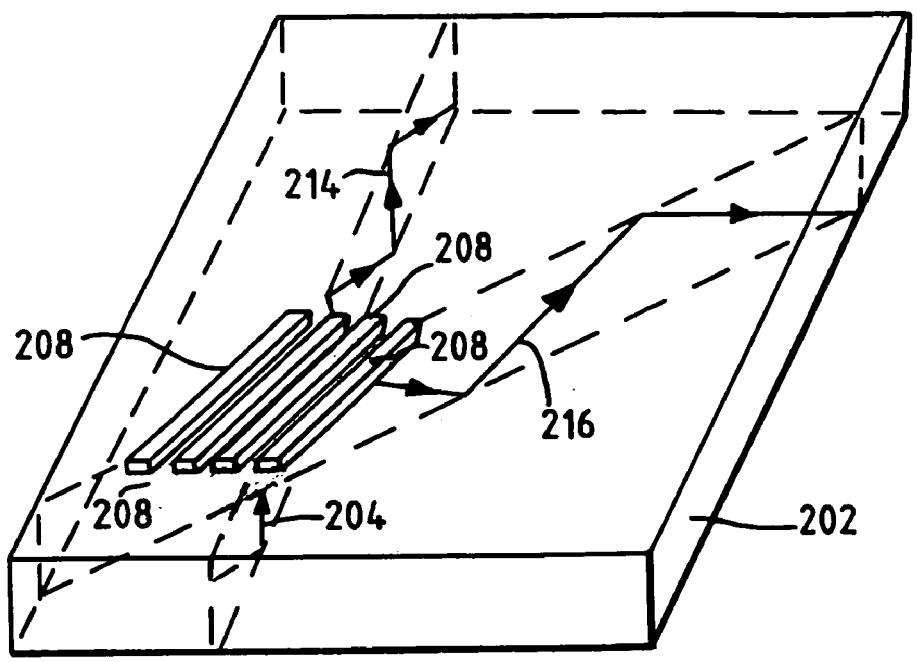
FIG. 4A is a perspective view of the structure of FIG. 2 showing the switching of an incident signal.
Figure 4B:
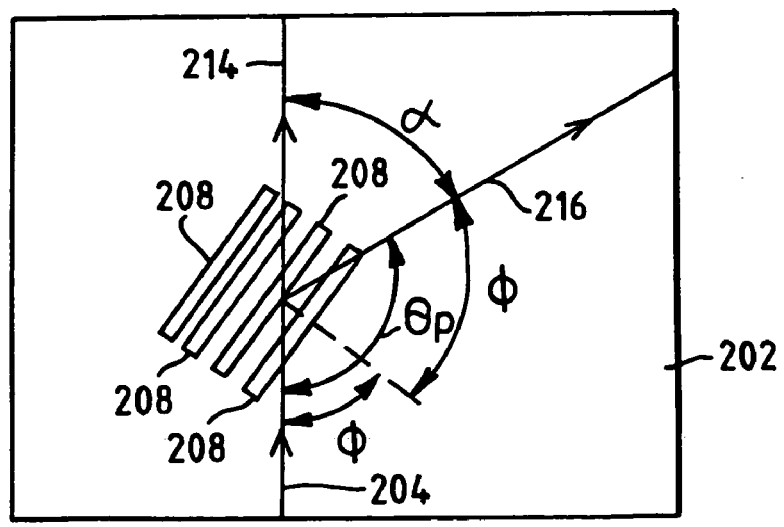
FIG. 4B is a top view of the structure of FIG. 2 showing the reflection of an incident light signal into a reflected signal at an angle, $\alpha$.

To explain generally the operation of the HOE 100, the strips 108 cooperate with the top surface 106 to define a diffraction grating pattern. The incident light 104 hits the diffraction grating pattern and is reflected as shown, and described below, thereby establishing HOE 100 as a tilted reflective mirror element. The spacings 'c' between the strips 108 together form an interface layer 110, which here is an air-substrate interface layer. As the light beam 104 is traveling in the substrate 102 under total internal reflection, a portion of the light beam 104 is diffracted at the interface layer 110 under total internal reflection. That is, a first portion of the light beam 104 is incident upon the air-substrate interface layer and is diffracted by the reflective action of the substrate spaces between the strips. Since these spaces are on the order of the wavelength of the incident light diffraction rather than plane wave reflection occurs. A second portion of the light beam 104 incident upon the HOE 100 is incident upon that portion of the top surface 106 directly below the strips 108. Here, the strips 108 will absorb light energy from the substrate and act like low loss waveguide resonators bounded on a top surface 112 and side surfaces by a lower index of refraction material, air in the preferred embodiment. A standing wave is essentially created in the strips 108, and absorbed light will eventually leave the strips 108 and reenter the substrate 102 as diffracted light that is phase shifted with respect to the light diffracted at the interface layer 110 between the strips 108. If the strips 108 have a higher index of refraction than the substrate 102, efficiency is further improved since the standing waves also are bounded by a lower surface with a transition to a lower index of refraction. The effect of the strip 108 and the interface layer 110 is to efficiently diffract the light beam 104 into a m=−1 mode that propagates within the substrate 102. Light beam 114 represents this reflected signal. Path 116 is the path light beam 104 would travel within the substrate 102 if unaffected by strips 108. The properties of the reflected light beams of the disclosed HOEs are discussed in more detail with respect to FIGS. 4A and 4B. The strips 108 are disposed in direct physical contact with top surface 106 of the substrate 102. In other embodiments, however there is no direct physical contact.

FIG. 1 and other figures to be discussed are in contrast with known devices, which show TIR only in waveguides separately formed in substrates using expensive doping and other formation techniques. The use of a substrate for signal propagation is preferred over that of a waveguide for numerous reasons. Signals propagating in a substrate are not confined as with waveguides thereby allowing flexibility in switch design and greatly reducing the coupling problems inherent in waveguide structures, where, for example, a signal in one waveguide had to be switched for propagation into another waveguide. Additionally, using the substrate for TIR provides a quasi-free space propagation for signals that allows great flexibility in coupling switched output signals into output fibers, multiplexers, and other optical devices. Moreover, using a substrate eliminates the extra fabrication required to form waveguides in or on a substrate material, thereby reducing switch design, fabrication, and cost. Having acknowledged these advantages and while using the substrate with an air interface for propagation is preferred, the substrate 102 could, nonetheless, be altered to include waveguides for purposes such as coupling optical signals to optical fibers.

Figure 2:
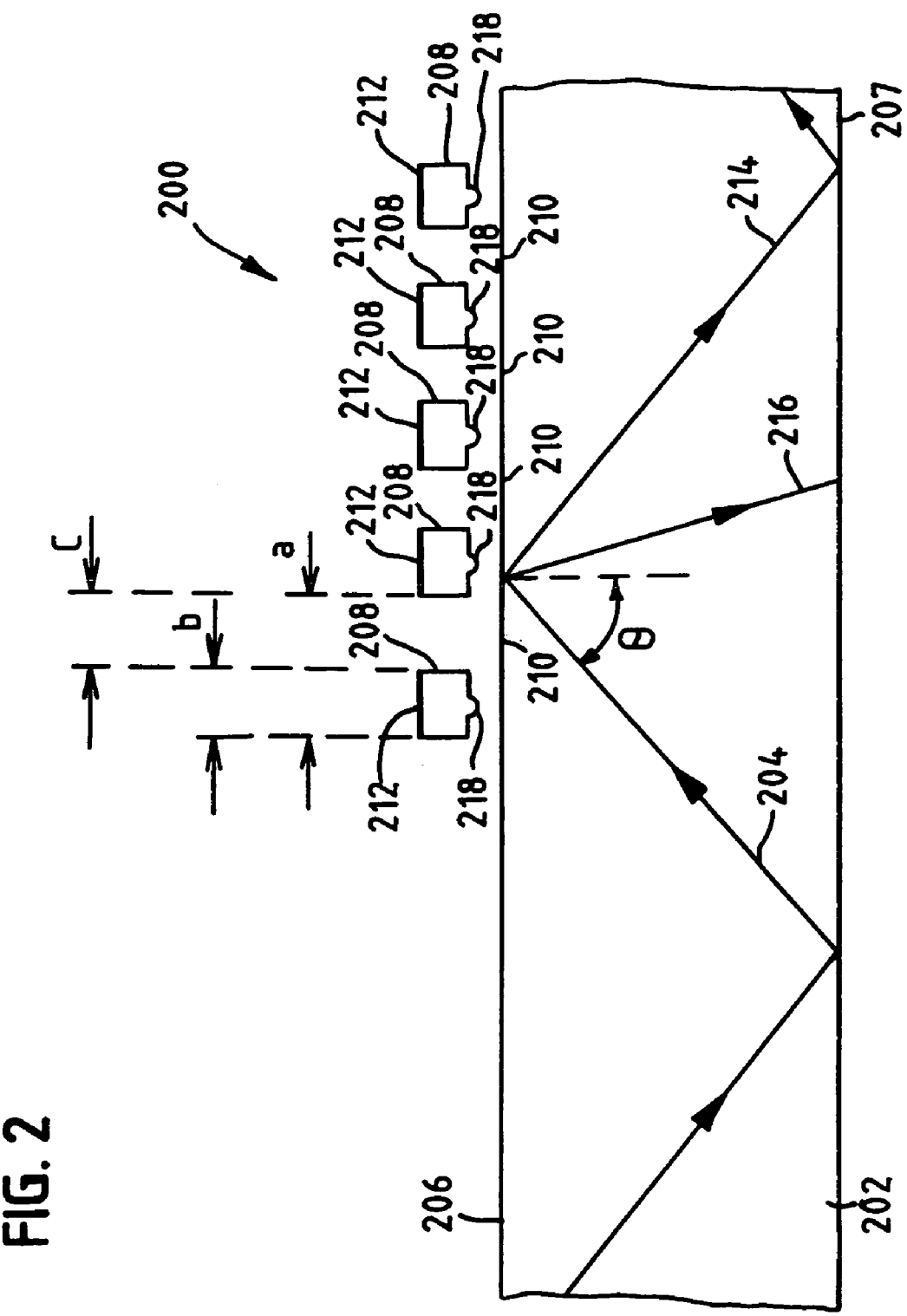
FIG. 2 is a cross-sectional view of an alternative HOE in which strips forming the HOE are disposed above the optical substrate and moveable relative thereto, in accordance with an embodiment of an optical switch.

Whereas FIG. 1 shows a HOE in physical contact with a substrate, FIG. 2 shows an HOE 200 disposed above (i.e., out of physical contact with) a substrate 202 and moveable relative thereto from a decoupled (or "off") position, in which light 204 passes through the substrate 202 unfettered, and a coupled (or "on") position, in which light 204 is affected by the HOE 200. Thus, the HOE 200 can function as a switch.

Light beam 204 propagates within the substrate 202 under TIR. TIR propagation in the substrate 202 may be achieved from the coupling of light into the substrate, see FIGS. 7 and 8 below. Furthermore, as with FIG. 1, TIR need only be established on a top surface 206 of the substrate 202 with mirrors or a reflective layer on a bottom surface 207 of the substrate, though preferably TIR would occur at both surfaces 206, 207.

The HOE 200 is formed of strips 208 preferably positioned above the top surface 206 of the substrate 202. The strips 208 cooperate with the substrate 202 like the strips 108 in HOE 100, the difference in FIG. 2 being that the strips 208 need not be in direct physical contact with the top surface 206, but rather are in coupling contact with the substrate 202 through an evanescent field. When the strips 208 are within the evanescent field extending above the top surface 206 (i.e., the "on" position), a portion of light beam 204 will be coupled into the strips 208. This coupling of the strips 208 may be thought of as being similar to that of frustrated total internal reflection. The action of the strips frustrates the total internal reflection of the optical signal and causes the signal to be redirected. When the strips 208 are out of evanescent field coupling distance (i.e., the "off" position), the light beam 204 is unaffected by the strips 208, and the light beam 204 will continue to propagate as signal 214. In this way, adjusting the air-gap height of the strips 208 will switch the incoming light beam 204 from the path 214 into a reflected light beam path 216.

The strips 208 and substrate 202 can be thought of as combining to form a diffraction pattern of the HOE 200, like that formed by the structure of FIG. 1. A portion of the light 204 is incident upon an interface layer 210 existing at the top surface 206, but only over those portions of the top surface 206 coinciding with the spaces between the strips 208. The strips 208 are bounded by a top surface 212, above which is an air surrounding. The resonator operation of the strips 208 is like that of strips 108 of FIG. 1, except in FIG. 2 the strips 208 receive energy through evanescent coupling in the preferred embodiment and not from in-contact refraction at a physical boundary. The effect of the strips 208 and the interface layer 210 is to collectively diffract the light beam 204 into a m=−1 mode, represented in FIG. 2 by the reflected path 216. The minimized m=0 mode coincides with the normal path light beam 204 would travel if unaffected by the strips 208, i.e., light beam 214.

Figure 3:
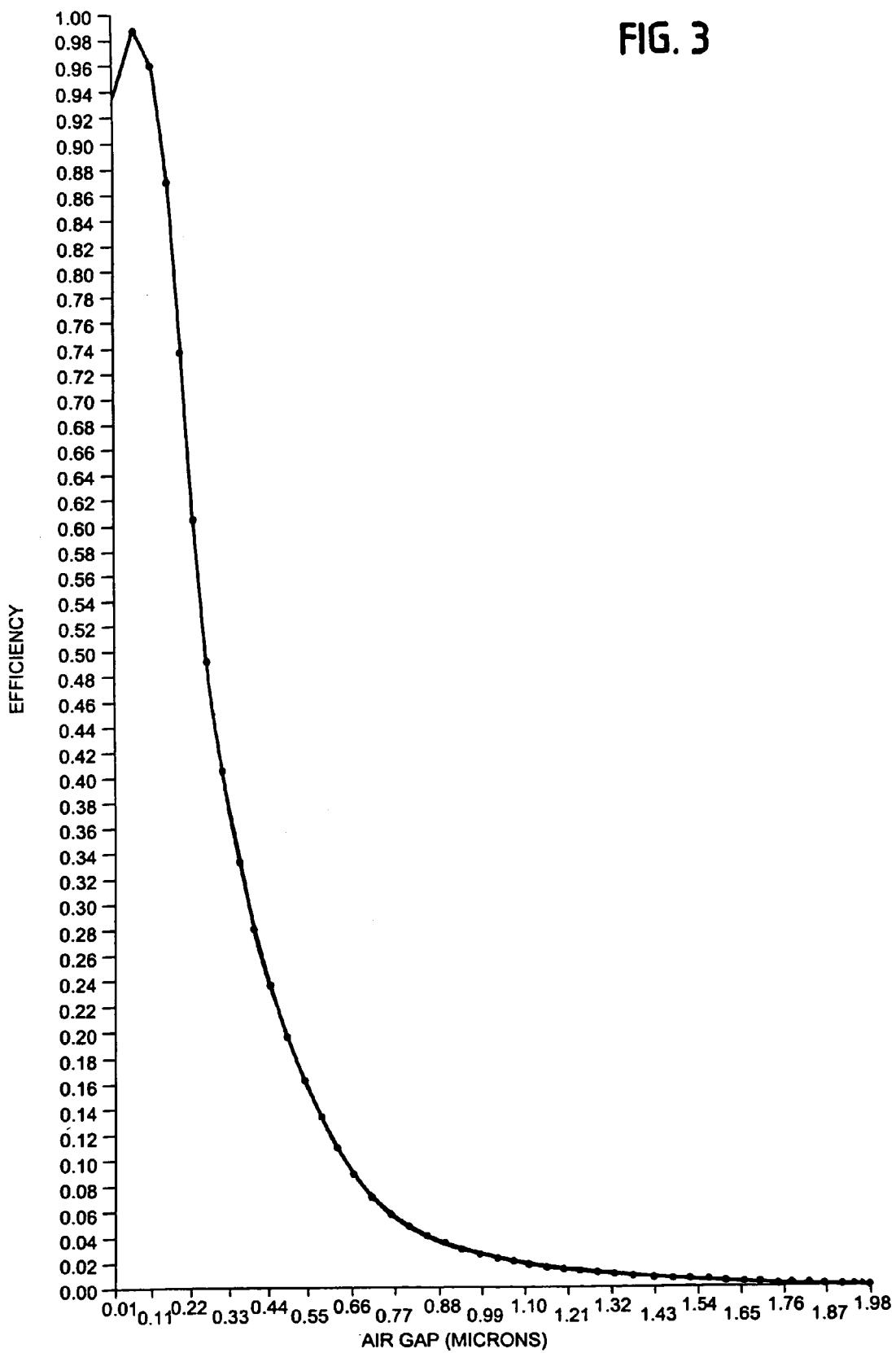
FIG. 3 is a graph of the gap height of an HOE versus HOE efficiency in accordance with an exemplary optical switch.

The depth of the evanescent field above the top surface 206 determines the air-gap height between the strips 208 and the top surface 206 that establish the "on" and "off" positions. FIG. 3 is a graph indicating the efficiency of silicon strips forming an HOE above a sapphire substrate for different gaps between the top surface 206 of the substrate 202 and the bottom of the strips 208. Efficiency represents the ratio of power in the m=−1 mode to the incident power. For the following parameter conditions 'a'=1.5 $\mu$m, strip height=2.15 $\mu$m, wavelength $\lambda$=1.55 $\mu$m, TE mode propagation, $\theta$=36°, and $\phi$=59.8° (i.e., $\alpha$=60.4°) (some of these parameters are explained in detail below, others above), the efficiency of the HOE acting as a grating is as shown. Generally, HOE efficiency is inversely proportional to the air-gap in an exponential fashion. This allows the switch to be placed in a fully "off" position with a minimum amount of movement. As can be seen the highest efficiency is achieved when near the air-gap height about 0.11, and thus, FIG. 1 may be considered as an illustration of a moveable HOE that is moved into the highest efficiency air-gap height.

Due to stiction, however, it may be desirable for strips to be formed not in physical contact with the top surfaces of the substrates, but rather above the substrate a desired amount. This can be facilitated with the use of small bumps 218 that are formed on the bottom surfaces of the strips. They are commonly used in such structures to limit the contact area subject to stiction forces.

FIG. 3 also shows that the HOE is out of coupling contact above 2 $\mu$m, i.e., the HOE would be in the "off" position. In the preferred embodiment of FIG. 2, however, the air-gap for the "off" position is set at about 12 $\mu$m to ensure that industry standards, such as the Telecordia GR 1073 standard, is met. These standards effectively limit the amount of signal that can leak through a switch in an "off" position. As the depth of the evanescent field depends on numerous parameters, the ranges of the air-gaps in FIG. 3 are exemplary. Indeed, as $\theta$ increases the evanescent field extending above the substrate becomes shallower, with the maximum evanescent field occurring at or near the critical angle for TIR. As a result, preferred ranges of $\theta$ for the embodiments disclosed herein is from the critical angle to about 10° above the critical angle.

One feature of the HOE 200 is that the reflected light beam 216 travels in a plane that is at an angle alpha, $\alpha$, to the plane of propagation of the light beam 204. Thus, reflected light beam 216 travels in a plane extending out of the illustration of FIG. 2. This propagation is more readily apparent in FIGS. 4A and 4B. This feature facilitates using the HOE 200 as an optical switch by allowing a first detector or coupling means to be positioned for receiving the unswitched signal 214 and a second detector or coupling means to be positioned at an angle thereto for receiving the switched signal 216.

Figure 5:
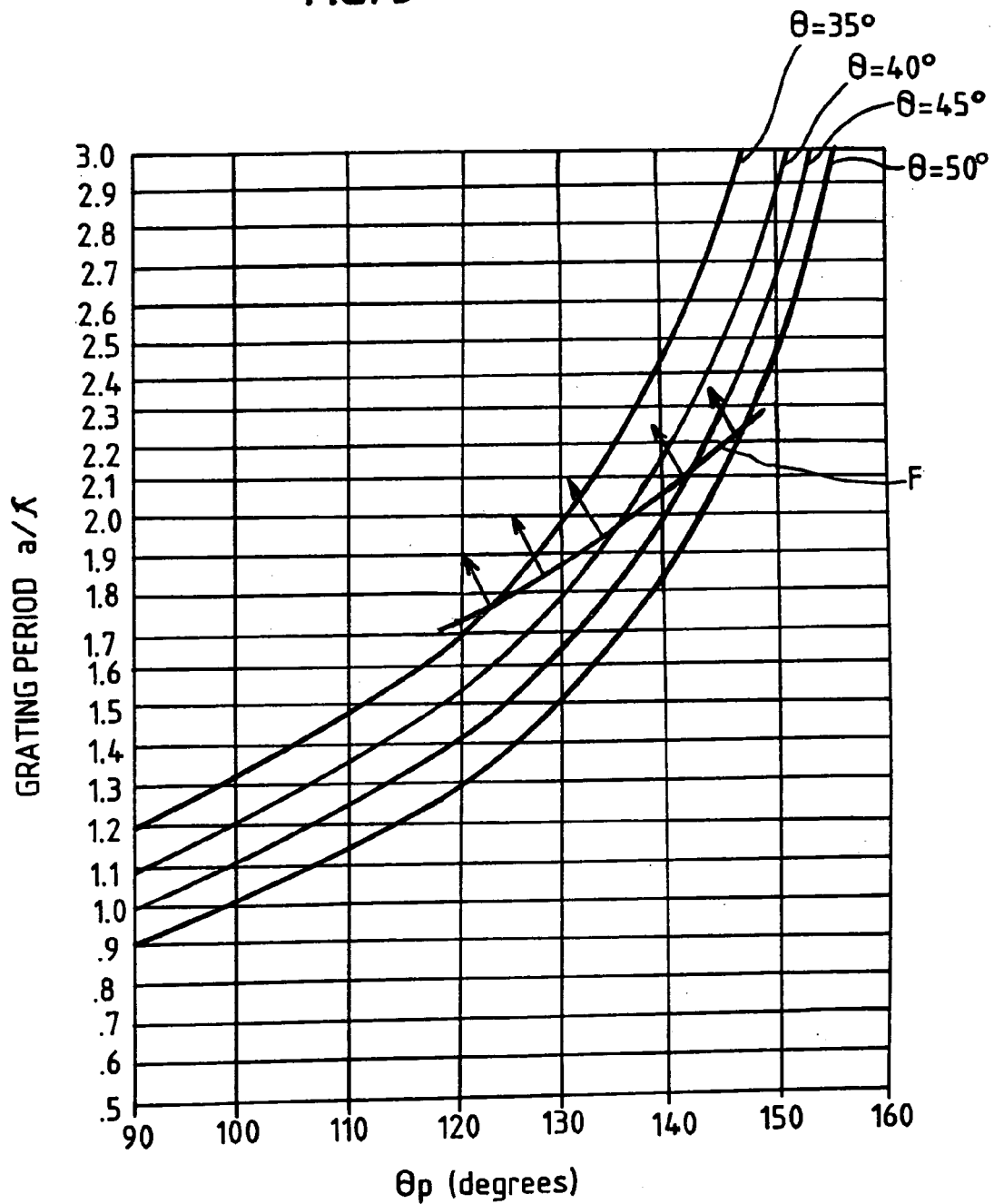
FIG. 5 is a graph of angle $\theta_p$ versus the grating period divided by wavelength for an HOE in accordance with an exemplary optical switch.

The angles of reflection $\alpha$ or $\theta_p$ created by the HOE 200 depends on numerous factors, including the strip periodicity 'a', the angle of incidence $\theta$, and the wavelength of the light $\lambda$. A sample graph showing the relationship between $\theta_p$ and these variables is shown in FIG. 5. FIG. 5 plots angle $\theta_p$ on the x-axis and 'a'/$\lambda$ on the y-axis for various angles of incidence $\theta$. Lambda ($\lambda$) is the wavelength of light propagating inside the substrate material which is equal to the wavelength of light in a vacuum divided by the refractive index of the substrate material. For sapphire the index of refraction is about 1.74 giving an internal $\lambda$ of about 0.89 $\mu$m for the 1.55 $\mu$m optical communications channel. As can be seen, for $\theta$=35°, 'a'/$\lambda$ of 1.5 will result in $\theta_p$ of approximately 110°. Similarly, with $\theta$=45° an 'a'/$\lambda$ of 1.5 will result in $\theta_p$ of approximately 125°. The graph also shows that $\theta_p$ can range from about 90° to about 145° for the given angles of incidence $\theta$, depending on the parameters. The graph assumes that the switched beam will have the same angle of incidence with respect to the substrate surface as the incident beam, albeit in a different plane of propagation. The graph also shows exemplary limitations on 'a', though 'a' ranges generally extend from approximately 0.5$\lambda$ to 3 $\lambda$ depending on parameters. The graph of FIG. 5 also shows a forbidden region, extending above a line F, within which light is reflected into more modes than just the m=−1 mode.

Returning to FIG. 4A, it can be seen that to reflect the incident light beam 204 into the propagation path 216 the strips 208 are not at right angles to the plane of propagation of the light beam 204, but rather are at an angle thereto. In particular, the strips 208 are perpendicular to a line bisecting the angle $\theta_p$. If the strips 208 were at right angles to the plane of propagation of light beam 204, the reflected light would be in the plane of propagation of light beam 204. Also, it can be seen that in the preferred embodiment the strips 208 are parallel, linear strips. Other strips, such as curved strips for focusing, may also be used. In fact, known grating software programs can be used to develop numerous types of grating designs given the desired conditions and parameters set forth herein.

The thickness of the strips 208 establishes a phase shift between the light reflected from the interface layer 210 and the light reflected from the resonator strips 208. In the preferred embodiment, the thicknesses for the strips 208 are identical. Preferably, the strips 208 would have thicknesses above 1 $\mu$m to ensure that the strips 208 have enough structural rigidity to be moveable between the "on" position and the "off" position. The strips 208 could have smaller thicknesses.

Figure 6:
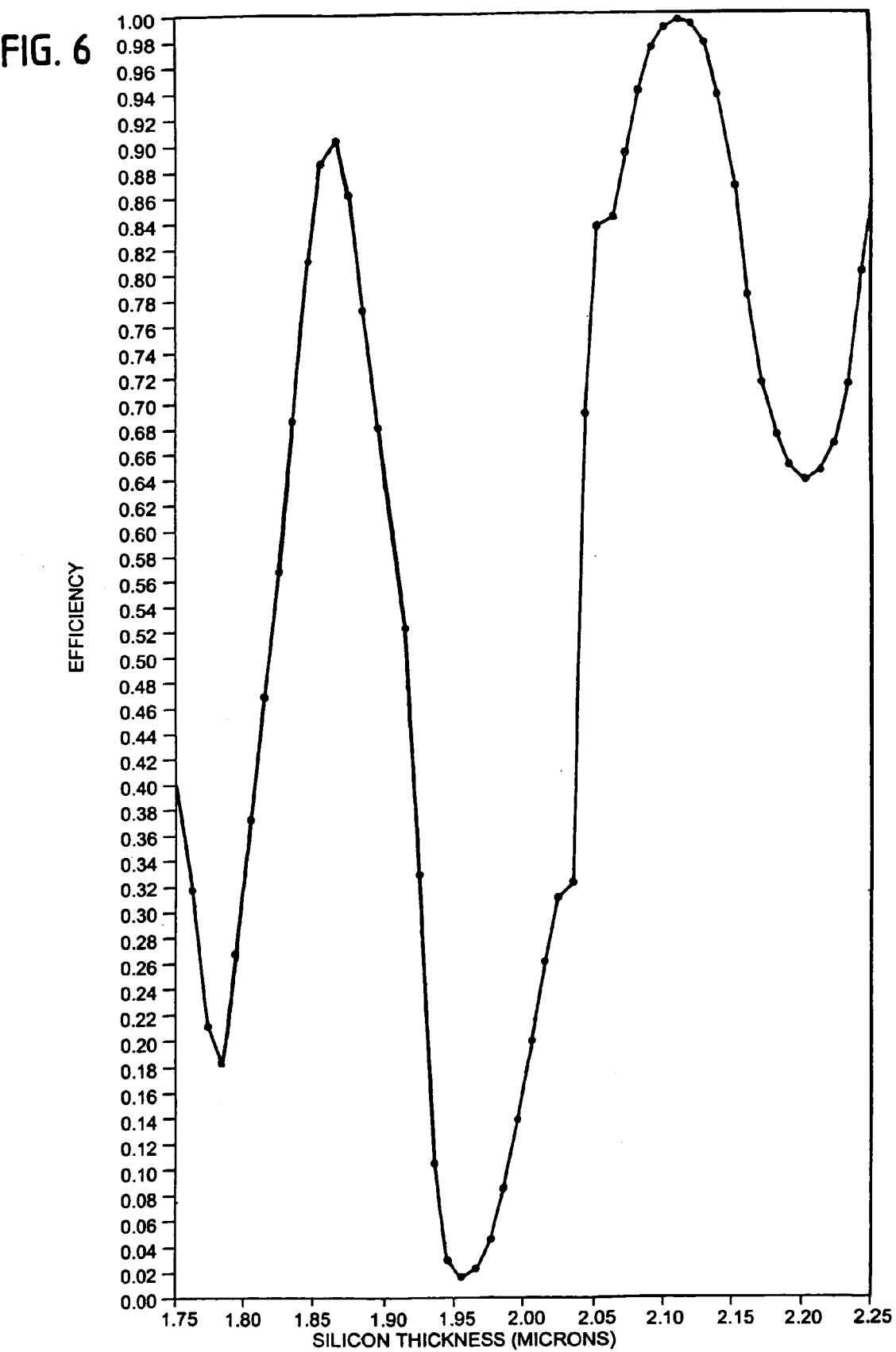
FIG. 6 is a graph of HOE strip thickness versus HOE efficiency in accordance with an exemplary optical switch.

A graph showing HOE efficiency versus silicon strip thickness is shown in FIG. 6. In this exemplary graph, the substrate is made of sapphire, the incident beam is TE polarized, 'a'=1.5 $\mu$m, $\lambda$=1.55 $\mu$m, air-gap height of 500Å, $\theta$=36°, and $\phi$=59.8 (i.e., $\alpha$=60.4°). As is shown, there are numerous strip thickness which produce very high efficiency. For the plotted example, efficiency peaks occur at approximately 1.87 μm and 2.12 μm. In fact, as the thickness of the strips 208 is to be chosen to impart the appropriate phase shift on the absorbed light, multiple harmonics of a particular thickness would also impart the same phase shift. An advantage of the HOEs of the preferred embodiments is that strip thickness can be chosen such that the efficiency of the HOE switch is substantially independent of the polarization state of the incident light beam. This is a design parameter called polarization dependent loss as set-forth by the Telecordia GR 1073 standard.

Another feature of HOE 200 is that the light reflected from it into the m=−1 mode is reflected at an angle so that the reflected light 216 still travels in the substrate under TIR. The reflection of incident light beam 204 into a totally internally reflected path is achieved by adjusting the grating periodicity 'a', as shown by the graph in FIG. 5.

Returning to FIG. 2, the substrate 202 may be any of the materials previously described with respect to substrate 102 and is preferably single crystal sapphire. Sapphire is optically transparent at the infrared wavelengths common for optical communications, e.g., 1550 nm and 1310 nm. Additionally, sapphire is a hard, etch resistant material amenable to providing a processing etch stop for any material that may be deposited on the substrate 202 to form the strips 208.

The strips 208 and bumps 218 are preferably formed of poly-silicon, but they may be formed of other optically transparent materials, such as various forms of silicon (crystalline and amorphous), alumina, sapphire, silicon-nitride, germanium silicon, and other optically transparent materials amenable to micro-electromechanical systems (MEMS) processing techniques.

As stated above, there are numerous ways of coupling light signals into and out of a substrate 202 that utilize TIR propagation, the easiest of which would involve either cleaving an input fiber, cleaving an edge of the substrate, providing a cleaved element between the optical fiber and the substrate, or some combination of these. The advantage of cleaving the fiber is that this coupling method is cheap, though the other methods are also cost effective.

Figure 7:
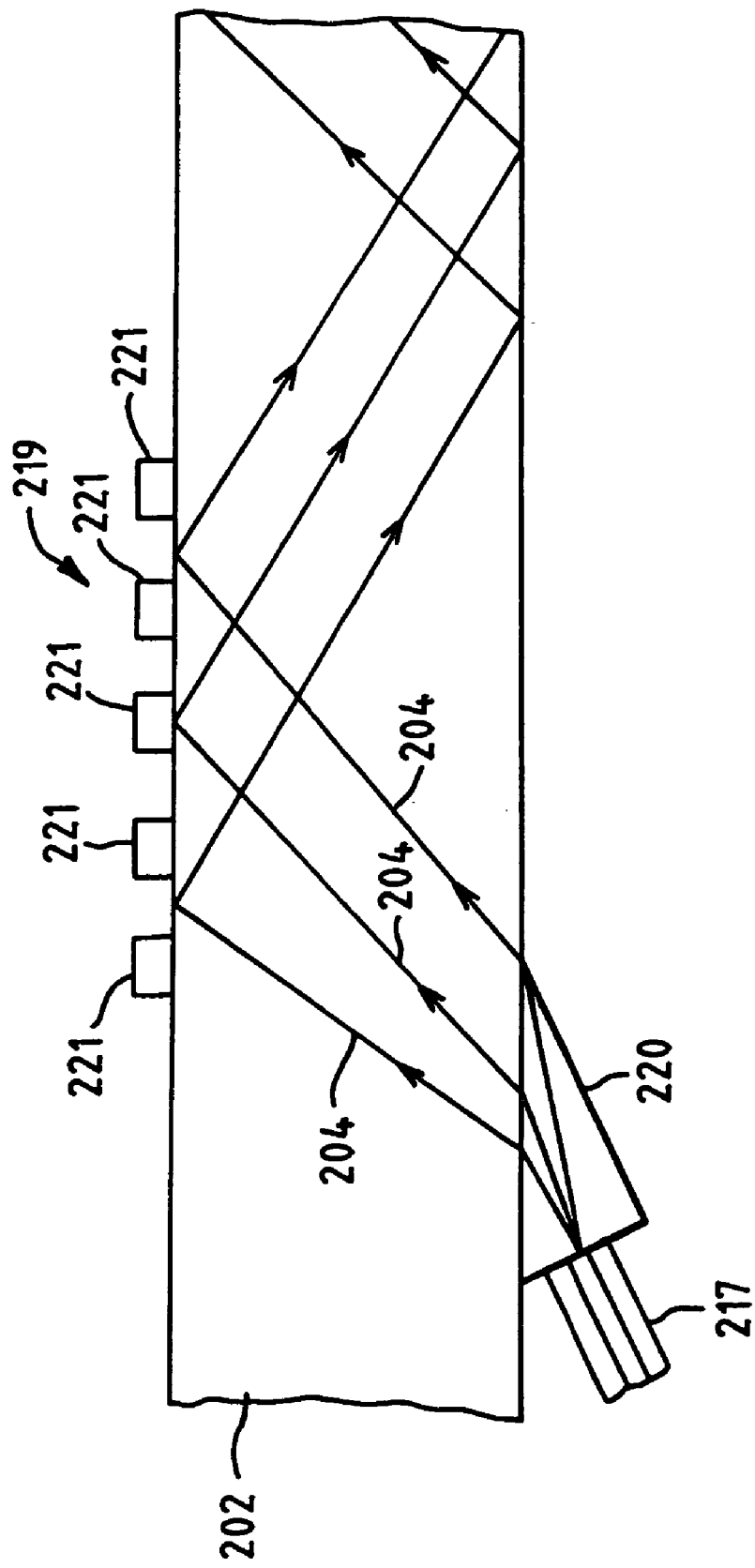
FIG. 7 is side view of an exemplary way of coupling light into the substrate for total internal reflection therein, in accordance with an embodiment.

FIG. 7 shows one way of coupling light beam 204 into or out of the substrate 202, where an optical fiber 217 is coupled to the substrate 202 by a refractive element 220. The refractive element 220 is formed of an optically transparent material with an index of refraction lower than that of the substrate 202. The refractive element 220 refracts light beam 204 for TIR propagation in the substrate 202 and a collimating element 219 is used to collimate the light beam 204. The collimating element 219 can be any known and suitable HOE structure or may be formed according to the HOE 100, described above, with strips 221 shown in cross-section. Forming the collimating element 219 like that of the HOE 100 has the advantage of making device fabrication easier.

Figure 8:
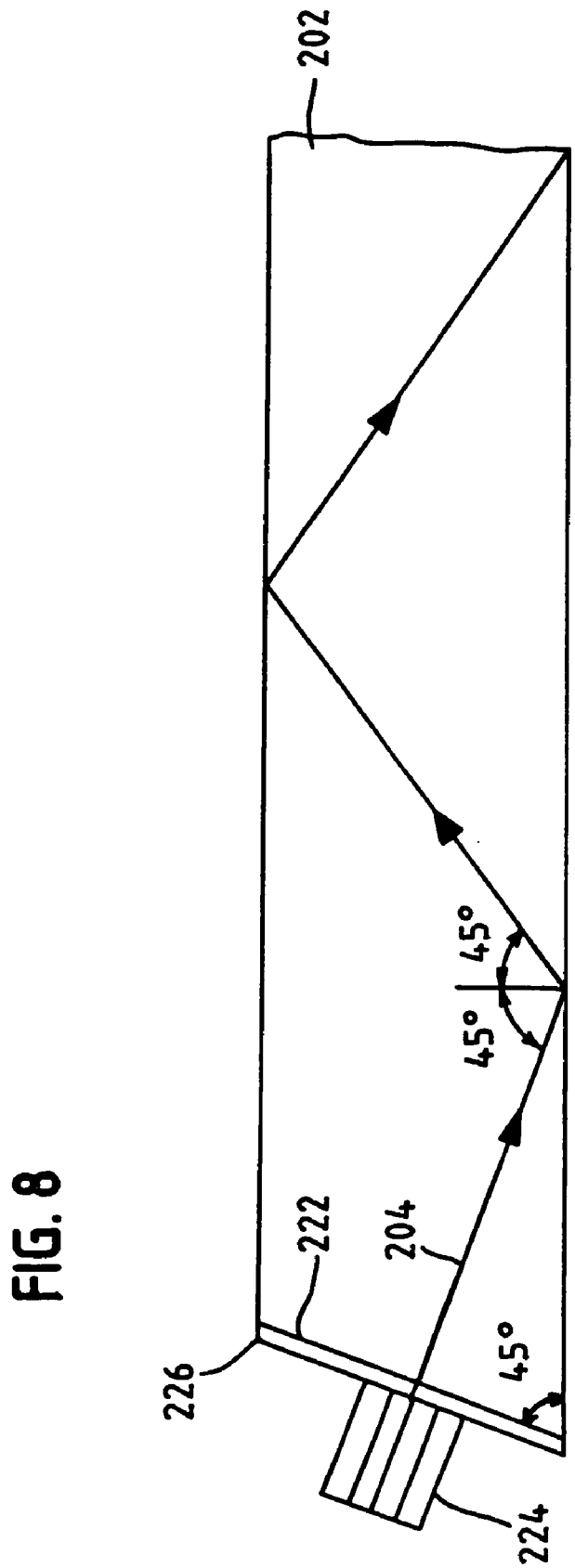
FIG. 8 is a side view of an alternative way of coupling light into the substrate for total internal reflection therein, in accordance with an embodiment.

An alternative structure that uses an external collimating element such as a gradient index lens grin lens (GRIN) fiber assembly is shown in FIG. 8. Here, the substrate 202 has a cleaved side surface 222. At a 45° cut, the surface 222 will receive the collimated light signal 204 from a GRIN lens element 224 for TIR propagation within the substrate 202. The GRIN lens 224 could receive an input from an optical fiber lens 224. The GRIN lens 224 may be coupled directly to a refractive element or a thin layer of anti-reflecting coating 226 that minimizes reflection losses. The coupling shown in FIG. 8 would allow the use of commercially available components to collimate and collect the light beams. This coupling allows incoming fibers to side-couple instead of coupling through a top or bottom surface of the substrate, as shown FIG. 7.

Moving to switch operation, there are various ways to switch an HOE from the "on" position to the "off" position. Generally, the flex needed to move the HOE can result from the strips of the HOE, where the strips themselves are made to flex into and out of evanescent field coupling. Alternatively, the structure or frame supporting the strips of the HOE can be made to flex. In either case, the flexing structure should also be spring biased to either an "on" or "off" position to ease switch operation.

Figure 9:
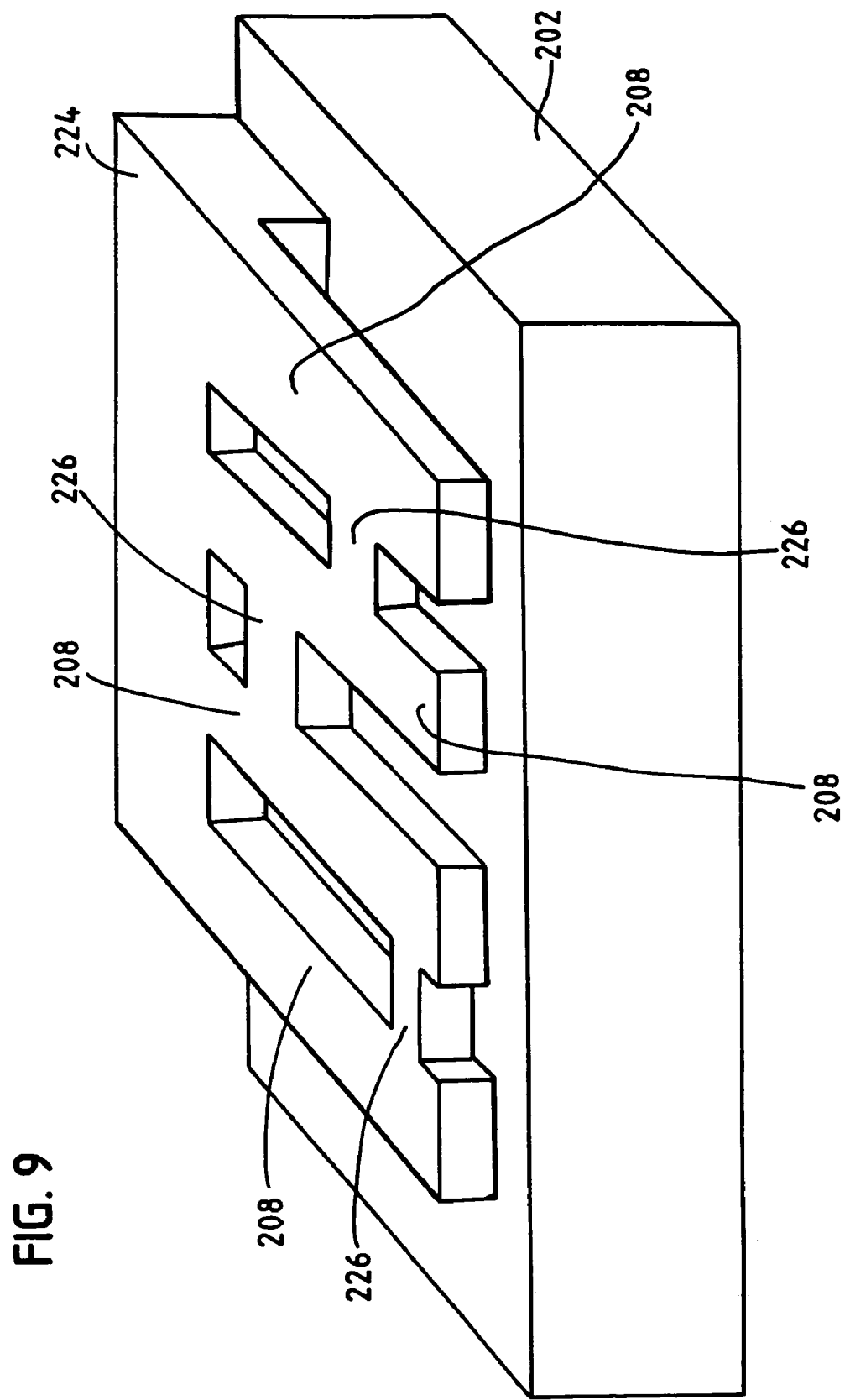
FIG. 9 is a perspective view of the HOE of FIG. 2 showing an exemplary cantilevered means of mounting using an anchor portion to suspend the strips of an HOE for movement.

To set forth a general HOE actuator, FIG. 9 shows an exemplary way of mounting the strips 208 for movement. Here, strips 208 are suspended from a rigid anchor portion 224 affixedly mounted to the top surface 206. This is a cantilevered configuration in which the strips 208 extend outward from the anchor portion 224 and are free standing above the substrate 202. The strips 208 are close enough to the substrate 202 that the HOE 200 is biased in the "on" position, i.e., the strips 208 are within the evanescent field of a 1550 nm or 1310 nm light wave traveling within the substrate 202 under TIR. To add structural rigidity to the strips 208, cross connections 226 are formed therebetween. With the cross connections 226, the strips 208 can be made to move in unison avoiding twisting forces that could affect structures of such small size. For longer strips, there may be numerous cross connections between two strips. It is important for design configurations to avoid placing the cross connections 226 in a closely formed periodic fashion, however, as the cross connections 226 would collectively act as diffraction grating orthogonally oriented to the grating formed by the strips 208.

The poly-silicon forming the strips 208 is transparent in the infrared region and can be readily fabricated with standard 0.5 μm to 1 μm line-width photolithography MEMS manufacturing processes. By way of example, the strips 208 can be formed by deposition of a film of poly-silicon on the sapphire substrate 202 or by epitaxial growth of single crystal silicon on the sapphire 202. Standard photolithography can form the desired pattern in a photoresist layer and the pattern can be etched into the silicon with standard MEMS etching techniques similar to the commercially available multi user MEMS process (MUMPs™). In fabrication, a sacrificial layer, or spacer layer, will be deposited on the substrate top surface, between the silicon and the sapphire. This layer is typically silicon dioxide and is etched or dissolved to release the silicon structure from the substrate. The sapphire substrate is resistant to etching processes and allows the sacrificial layer to be dissolved without etching of the substrate. Any etching of the substrate would create a faint HOE pattern in the substrate that would not allow the switch to be turned fully off as required. It is common practice to form the small bumps on the underside of the silicon structure by patterning small depressions into the sacrificial layer before depositing the polysilicon layer. As stated above, these bumps minimize sticking during the release operation and during subsequent switch operation. The sacrificial layer can be dimensioned to position the polysilicon HOE in the "on" position or the device can be constructed so that it is biased into the "on" position with polysilicon spring elements. Preferably, the strips 208, bumps 218, rigid anchor portion 224, and cross connections 226 are formed of the same material, most preferably a poly-silicon material. The rigid anchor portion 224 and cross connections 226 could be formed of any of the above mentioned strip materials.

To move the HOE 200 from the biased "on" position to an "off" position, an electric field may be applied via an electrode disposed above the strips 208. As the strips 208 are partially conductive they will deflect away from the top surface of the substrate 202 under application of an electric field. As the evanescent field will not extend far above the top surface 206, more specifically the evanescent field tapers exponentially, the strips 208 need only deflect a small distance to place the HOE 200 in the "off" position.

Figure 10:
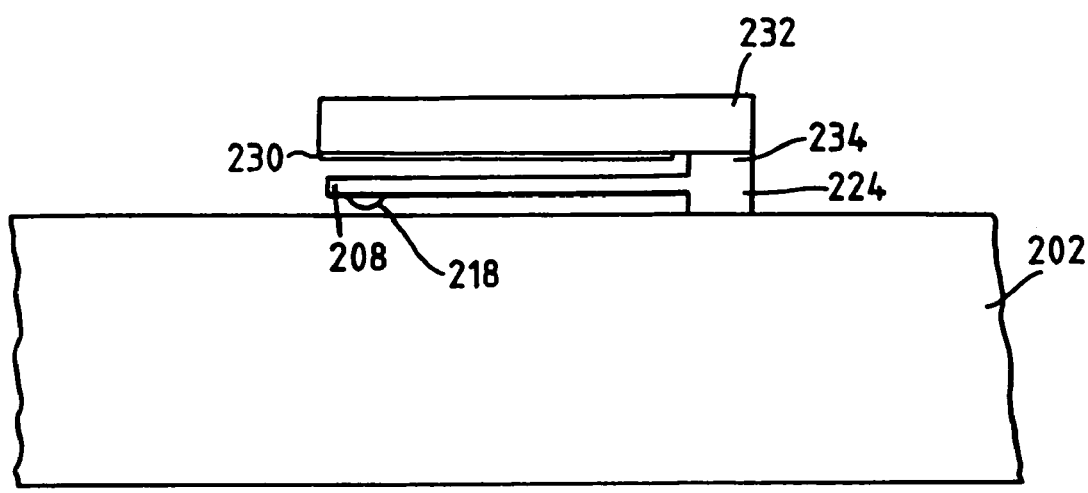
FIG. 10 is a top view of the HOE of FIG. 9 showing an electrode disposed above the strips of the HOE for moving the strips relative to the top surface of the substrate, in accordance with an optical switch.

FIG. 10 shows one method of deflecting the strips 208 using an electrode 230 positioned at least above a distal portion of the strips 208, and extending into and out of the illustration across all strips 208. The electrode 230 is mounted at a bottom surface of an insulating mounting plate 232, which is formed over a support member 234. The support member 234 may be formed of the same material as anchor 224, and in the illustration is opposite the same. The electrode 230 would receive instructions from a drive circuit and apply an electric field to the strips 208 in response thereto. To ease implementation, the strips 208 could be connected to a ground voltage. Further electrode 230 could extend longitudinally down the length of the strips 208 as shown.

Figure 11:
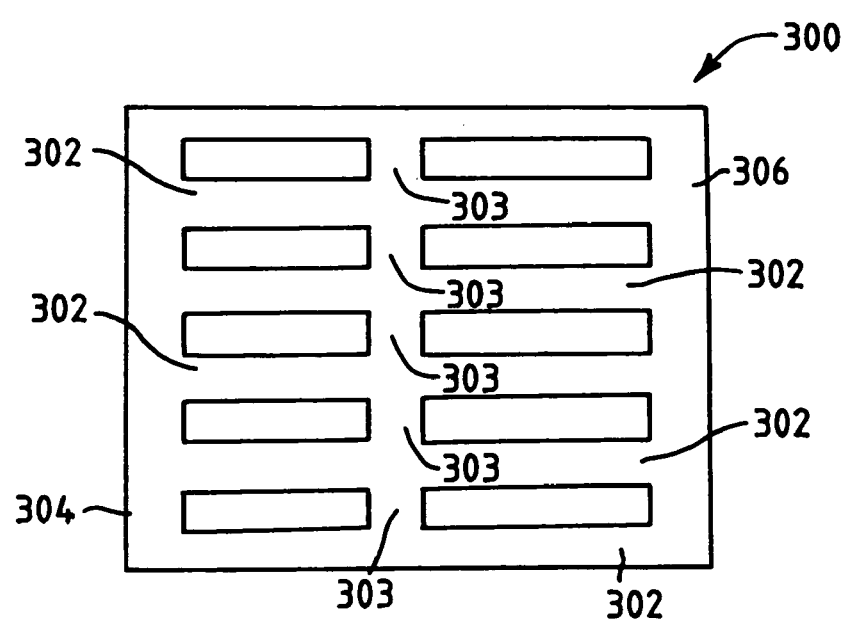
FIG. 11 is an exemplary partial top view of another HOE in accordance with an embodiment of an optical switch.
Figure 12:
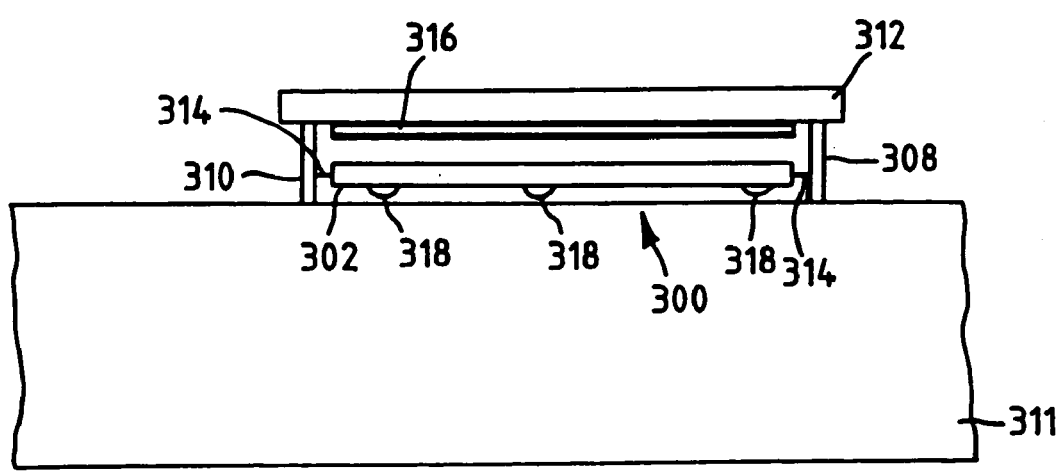
FIG. 12 is a side view of the HOE shown in FIG. 11 further showing a mounting structure and an electrode disposed above the strips.
Figure 13:
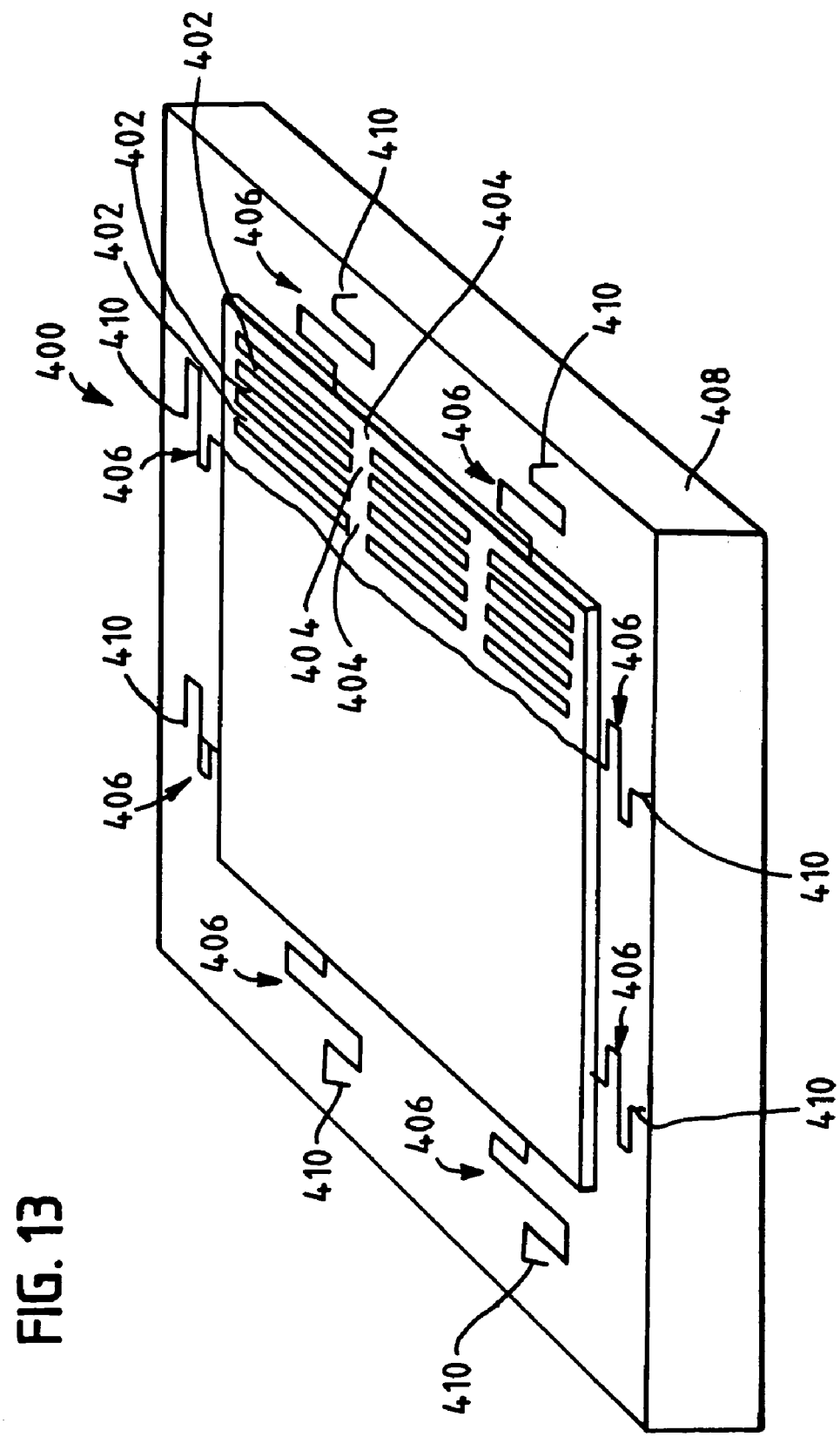
FIG. 13 is a perspective view of an HOE having an actuation member formed of flexible arms and mounting feet in accordance with a preferred embodiment of an optical switch.

FIGS. 12 and 13 show an alternative means to actuate a HOE for switching. In these embodiments, the flex used for switching is not in the strips forming the HOE, as with FIG. 10, but rather is with the structure connecting the strips to the top surface of the substrate. For example, exemplary HOE structure 300 of FIG. 11, which has strips 302, cross connections 303, and side portions 304 and 306 and which may be formed of the same materials and in a similar way to that of the HOE structure 200 described in FIG. 2, can be actuated as shown in FIG. 12. FIG. 12 shows a mounting structure having two mounting bases 308 and 310 formed on a substrate 311 and a mounting plate 312 formed on the bases 308, 310. The HOE 300 is coupled to the mounting bases 308 and 310 via flexible connections 314. The flexible connections 314 could be any number of MEMS processed springs or structures allowing flex, at least in an upwards direction. The flexible connections 314 could alternatively allow bi-directional, up and down, deflection. An electrode 316 is mounted to the mounting plate 312 and, in this embodiment, is shown extending transversely and longitudinally across the strips 302, which would be grounded. In such a configuration, the HOE 300 could be biased in the "on" position and moveable to an "off" position under an electric field from the electrode 316. Alternatively, the HOE 300 could be biased in the "off" position or the HOE 300 could be biased for upward and downward movement under control of the electrode 316. The HOE 300 could have bumps 318 formed on a bottom surface to prevent stiction between the HOE 300 and the substrate 311 during operation.

FIG. 13 shows an alternative actuation structure for an HOE 400. The HOE 400 is formed of the same materials and in a similar manner as previously mentioned. Typical lateral dimensions for the HOE 400 would be 250 to 1000 μm. Strips 402 extend along a length of the HOE 400 and cross connections 404 are provided to add structural rigidity. A plurality of spring arms 406 are connected to the HOE 400. The springs arms 406 are also connected to the top surface of a substrate 408—substrate 408 being like that of the substrates previously described. Specifically, feet 410 serve as posts for the spring arms 406 and have a height, in the preferred embodiment, sufficiently small to bias the HOE 400 in the "on" position. The geometry and size of the spring arms 406 are chosen to allow the HOE 400 to deflect into the "off" position under application of an electric field. As will be appreciated by persons of ordinary skill in the art, many other geometries may be used to achieve the desired flex and spring bias for HOE switching operation. To affect actuation, an electrode could be mounted above the HOE 400 using an appropriate mounting structure, of which a structure similar to that shown in FIG. 12 is an example.

While electrostatic actuation is used in the preferred embodiment for HOE 300 movement, actuation may alternatively be affected by thermal, piezoelectric, or electro-optic actuation.

As can be seen from FIG. 13, due to the micron scales of the HOEs herein, HOEs in application would have many strips and, where used, many cross connections. Therefore, the above figures should be considered as exemplary showing a general number of strips, with the understanding that many strips, like in HOE 400, may be in fact be used.

Figure 14:
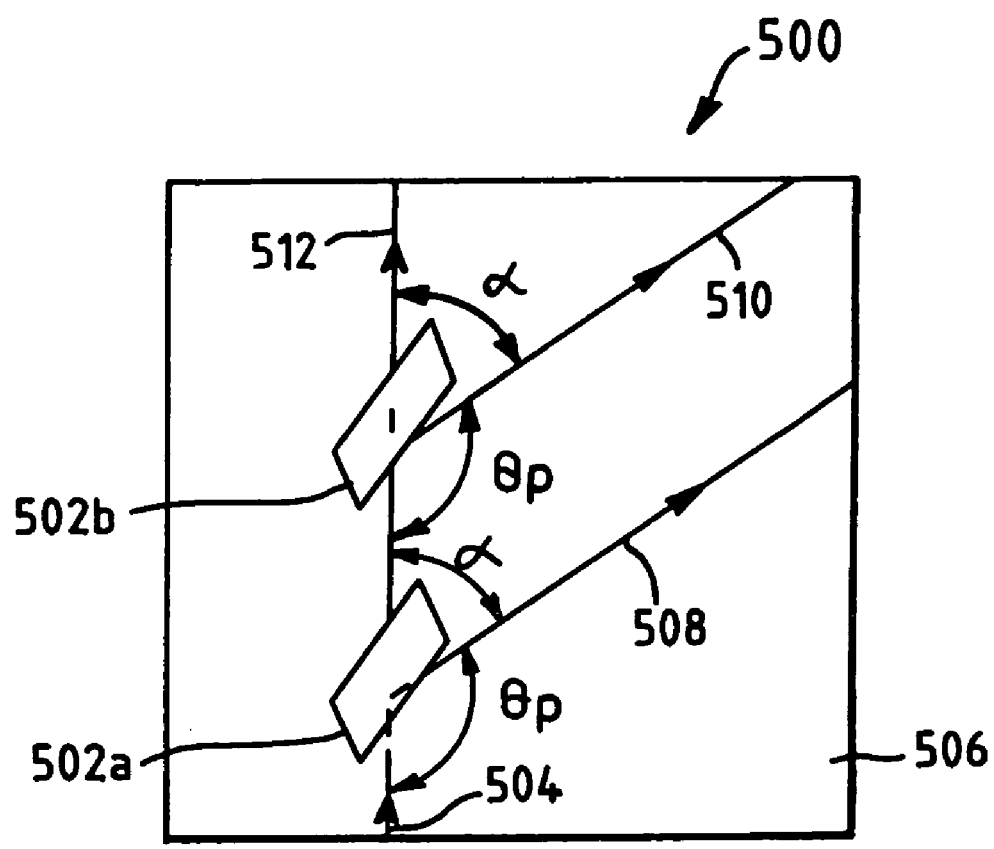
FIG. 14 is a top view of a 1×2 optical switch formed with HOEs, in accordance with an embodiment of a 1×N optical switch.

FIG. 14 shows a top view of an exemplary optical switch 500 that can use any of the above-described HOEs, represented generally by HOE 502a and HOE 502b, to form a 1×2 optical switch. The concepts of FIG. 114 can be extended to form an 1×N optical switch. Two HOEs 502a, 502b are shown and both are aligned with a propagation path of an incoming light signal 504. The incoming light signal 504 travels within a substrate 506 under TIR similar to the previously described substrates. The two HOEs 502a, 502b are disposed above the substrate 506 and individually moveable relative thereto between an "on" position and an "off" position, via any of the actuation structures previously described. In particular, when the HOE 502a is in the "on" position, the light signal 504 is reflected along a first reflected path 508. The path 508 is not orthogonal to the plane of propagation of signal 504, but rather at the angle, α, to that plane of propagation. When the HOE 502a is in the "on" position, preferably substantially all of the light signal 504 is reflected along path 508, leaving a minimum m=0 mode light signal incident upon HOE 502b. If switch 502b is in the "off" position this minimum light signal will continue along path 512 and be absorbed or otherwise prevented from reflecting back into the device by suitable means. Note that this m=0 mode light signal does not propagate to output path 510 as switch 502b is fully off due to the exponential nature of the evanescent field. This is an important parameter for commercial switches as mentioned above.

If HOE 502a is in the "off" position, light signal 504 is unaffected and continues to travel under TIR within the substrate 506 until the light signal 504 reaches the second HOE 502b, where if HOE 502b is in the "on" position, then light signal 504 is reflected into a second reflected path 510, also at the angle, α, to the direction of propagation of light signal 504. Preferably, HOE 502a and HOE 502b are identical and paths 508 and 510 are parallel. Further, while not shown, the paths 508 and 510 may lead to output fiber outputs to couple reflected light for using the structure illustrated as an optical fiber to optical fiber switch. Coupling into other optical devices is also possible, and if both the HOE 502a and the HOE 502b are in the "off" position, the light signal 504 will continue through the substrate 506 unaltered, on signal path 512. Signal path 512 could also be coupled to an output fiber and be used for monitoring purposes. A small signal representing the input signal will always be present at 512 due to incomplete suppression of the m=0 mode. The device could also be configured as a variable splitter or attenuator by controlling the HOE air-gaps to positions intermediate to on and off. For example, HOE 502a could be positioned for 50% efficiency, leaving 50% of the incident signal 504 to hit the HOE 502b, which could be positioned for near 100% efficiency. This design would be like a 1×2 splitter, with the output signals along paths 508 and 510 each having about 50% of the energy of the incident beam.

While the structures shown above have HOEs, formed of strips, it will be understood to persons of ordinary skill in the art that the structures shown could be more generally DOE structures, having larger dimensions than that of HOEs, for examples a number of times larger than the 'a'/λ values plotted in FIG. 5. Therefore, the present disclosure and the claims below are considered to encompass DOE structures, as well.

Many additional changes and modifications could be made to the disclosed embodiments without departing from the fair scope and spirit thereof. The scope of some changes is discussed above. The scope of others will be come apparent from the appended claims.

We claim:

1. An optical switch comprising:
    a substrate for transmitting an optical signal within the substrate, where said optical signal propagates in the substrate in a first propagation direction along a first plane under total internal reflection; and
    a diffractive optical element disposed above a top surface of the substrate and moveable relative thereto between a first position substantially out of evanescent field coupling with the optical signal, such that the optical signal continues to travel in the first direction, and a second position in evanescent field coupling with the optical signal to alter the propagation of the optical signal in the substrate into a second propagation direction along a second plane that forms an acute angle with the first plane.

2. The optical switch of claim 1, wherein the substrate is formed of a material from the group consisting of quartz and sapphire.

3. The optical switch of claim 1, wherein the diffractive optical element is a holographic optical element.

4. The optical switch of claim 1, wherein said diffractive optical element is formed of a plurality of strips forming a diffraction grating, where each strip has a substantially equal width and where each of the strips are spaced apart a substantially equal spacing.

5. The optical switch of claim 4, wherein the width is substantially identical to the spacing.

6. The optical switch of claim 4, wherein the diffraction grating has a grating period, 'a', that is substantially equal to the wavelength of light of the optical signal in the substrate.

7. The optical switch of claim 4, wherein the diffraction grating has a grating period, 'a', that is between 0.5 λ and 3 λ, where λ is the wavelength of the optical signal in the substrate.

8. The optical switch of claim 4, wherein the strips are flexible for moving the diffractive optical element between said first position and said second position.

9. The optical switch of claim 8, wherein the strips are suspended from an anchor fixedly mounted to the substrate.

10. The optical switch of claim 4, wherein the strips are suspended from a first anchor and a second anchor by flexible members, where both said first anchor and said second anchor are fixedly mounted to the substrate and where the flexible members allow movement of the diffractive optical element between said first position and said second position.

11. The optical switch of claim 4, wherein the strips are biased in the second position, and wherein an electrode is disposed adjacent the strips for moving the strips into the first position.

12. The optical switch of claim 4, wherein the strips are linear and substantially perpendicular to a line bisecting an angle, $\theta_p$, between the plane containing the input signal and the plane containing the output signal.

13. The optical switch of claim 4, further comprising cross connections formed between the strips.

14. The optical switch of claim 4, wherein the strips are formed of a material selected from the grouping consisting of amorphous silicon, crystalline silicon, and poly-silicon.

15. The optical switch of claim 4, wherein the strips are formed of a material selected from the group consisting of alumina, sapphire, silicon nitride, and a poly-silicon/poly-germanium alloy.

16. The optical switch of claim 4, wherein the strips have an index of refraction higher than that of the substrate.

17. The optical switch of claim 4, wherein the strips have a thickness above 1 $\mu$m.

18. The optical switch of claim 17, wherein the strips have a thickness selected to maximize the intensity of the optical signal in the second direction.

19. The optical switch of claim 4, wherein the strip width is selected to maximize the intensity of the optical signal in the second direction.

20. The optical switch of claim 1, wherein the diffractive optical element is in physical contact with the top surface of the substrate when in the second position.

21. The optical switch of claim 1, wherein the optical signal propagating in the second direction is propagating under total internal reflection.

22. The optical switch of claim 1, wherein the optical signal is reflected off the top surface of the substrate under total internal reflection.

23. The optical switch of claim 1, wherein the optical signal is reflected off the top surface and a bottom surface of the substrate under total internal reflection.

24. The optical switch of claim 1, wherein the diffractive optical element is composed of a substantially transparent optical material.

25. The optical switch of claim 1, wherein the diffractive optical element operates by total internal reflection.

26. The optical switch of claim 1, wherein said diffractive optical element is formed of a plurality of strips forming a diffraction grating, where each strip has a width and a spacing distance associated therein, such that the widths and the spacing distances for the strips vary.

27. A holographic optical element for use with an optical substrate, wherein an incident light signal is propagating within the substrate in a primary direction of propagation reflecting off a top surface of the substrate under total internal reflection, comprising:
    a plurality of spaced-apart strips formed of an optically transparent material and disposed above the top surface of the substrate such that the strips collectively receive a first portion of the light signal and produce an output signal phase shifted from a second portion of the light signal reflected off the top surface of the substrate to produce a diffraction pattern within the substrate; and
    a suspension member adjacent to the plurality of strips and disposed for allowing movement of the strips from a first position in which the incident light signal is altered by the holographic optical element and a second position in which the incident light signal is unaltered by the holographic optical element.

28. The holographic optical element of claim 27, wherein the suspension member comprises a plurality of flexible arms mounted to the top surface of the substrate by a plurality of mounting members, the flexible arms being coupled to the strips.

29. The holographic optical element of claim 28, wherein the mounting members have a height such that the strips are biased in the first position.

30. The holographic optical element of claim 28, wherein the flexible arms are biased to return strips in the second position to the first position.

31. The holographic optical element of claim 28, wherein flexible arms are coupled to the strips to allow uniform movement of the strips into the first and second positions.

32. The holographic optical element of claim 28, wherein the flexible arms have a thickness equal to a thickness of the strips.

33. The holographic optical element of claim 27, wherein the suspension member does not extend above the top surface of the substrate.

34. The holographic optical element of claim 27, wherein the substrate is formed of sapphire.

35. The holographic optical element of claim 27, wherein the diffraction pattern has a grating period, 'a', that is between 0.75 $\lambda$ and 3 $\lambda$, where $\lambda$ is the wavelength of the incident light signal.

36. The holographic optical element of claim 27, further comprising an electrode disposed over the strips for moving the strips into the first and second positions.

37. The holographic optical element of claim 27, wherein the strips are linear and substantially perpendicular to a line bisecting an angle, $\theta_p$, between the plane containing the input signal and the plane containing the output signal.

38. The holographic optical element of claim 27, further comprising cross connections formed between the strips.

39. The holographic optical element of claim 27, wherein the strips are formed of a material selected from the grouping consisting of amorphous silicon, crystalline silicon, and poly-silicon.

40. The holographic optical element of claim 27, wherein the strips are formed of a material selected from the group consisting of alumina, sapphire, silicon nitride, poly-silicon, and germanium.

41. The holographic optical element of claim 27, wherein the strips have an index of refraction higher than that of the substrate.

42. The holographic optical element of claim 27, wherein the strips have a thickness selected to maximize the magnitude of the optical signal in an output direction of propagation.

43. The holographic optical element of claim 27, wherein the light signal propagating in the second direction is propagating within the substrate under total internal reflection.

44. A 1×N optical switch comprising:
a substrate for transmitting an optical signal within the substrate, where said optical signal propagates in the substrate in a first direction along a first plane and under total internal reflection; and
N diffractive optical elements disposed above a top surface of the substrate and each individually moveable relative to the substrate between a first position substantially out of evanescent field coupling with the optical signal, such that the optical signal continues to travel in the first direction, and a second position within evanescent field coupling with the optical signal to alter the propagation of the optical signal into a second direction along a second plane that forms an acute angle with the first plane, where N is an integer greater than $\theta 1$.

45. The 1×N optical switch of claim 44, wherein each diffractive optical element is formed of a plurality of strips forming a diffraction grating, where each strip has a substantially equal width and where each of the strips are spaced apart a substantially equal spacing.

46. An optical switch for use with a substrate, the optical switch comprising:
a plurality of strips disposed above a top surface of the substrate for movement relative to the substrate, each strip being spaced apart a spacing distance and having a strip width, whereby the sum, 'a', of the spacing distance and the strip width is chosen such that a light signal traveling within the substrate under total internal reflection along a first plane and incident upon an area of the top surface below said strips is reflected into a first diffracted order propagating within the substrate in a reflected direction of propagation along a second plane defining an acute angle, $\theta_p$, with respect to the first plane and propagating within the substrate under total internal reflection.

47. The optical switch of claim 46, wherein the sum, 'a', is between 0.5 $\lambda$ and 3 $\lambda$, where $\lambda$ is the wavelength of the light signal within the substrate.

48. The optical switch of claim 46, wherein the light signal is incident upon the diffraction grating at an angle, $\theta$, equal to or greater than 35°, $\theta$ being measured from a normal to the top surface of the substrate extending into the substrate, and wherein the sum, 'a', is chosen such that $\theta_p$ is larger than 20° is between about 90° and about 145°.

* * * * *

UNITED STATES PATENT AND TRADEMARK OFFICE
CERTIFICATE OF CORRECTION

| | | |
|---|---|---|
| PATENT NO. | : 7,003,187 B2 | Page 1 of 1 |
| APPLICATION NO. | : 09/905736 | |
| DATED | : February 21, 2006 | |
| INVENTOR(S) | : Roger L. Frick et al. | |

It is certified that error appears in the above-identified patent and that said Letters Patent is hereby corrected as shown below:

Title Page Second Page:

At line (56), Other Publications, line 3 2$^{nd}$ Reference, "Co mpact" should be -- Compact --.

At line (56), Other Publications, line 8 4$^{th}$ Reference, "Fabricati on" should be -- Fabrication --.

At line (56), U.S. Patent Documents, please add -- 4,753,513, 6/1988, Shikama --.

At line (56), U.S. Patent Documents, please add -- 5,561,558, 10/1996, Shiono et al. --.

At line (56), U.S. Patent Documents, please add -- 6,433,911, 8/2002, Chen et al. --.

In the Specification:

At Column 13, line 17, "be come" should be -- become --.

In the Claims:

At Column 16, line 20, "$\theta$1" should be -- 1 --.

Signed and Sealed this

Twenty-seventh Day of May, 2008

JON W. DUDAS
*Director of the United States Patent and Trademark Office*